(12) United States Patent
Hernandez

(10) Patent No.: US 9,484,741 B2
(45) Date of Patent: Nov. 1, 2016

(54) MULTIPLE VOLTAGE POWER BOX

(71) Applicant: Efren Hernandez, San Antonio, TX (US)

(72) Inventor: Efren Hernandez, San Antonio, TX (US)

( * ) Notice: Subject to any disclaimer, the term of this patent is extended or adjusted under 35 U.S.C. 154(b) by 441 days.

(21) Appl. No.: 13/865,750

(22) Filed: Apr. 18, 2013

(65) Prior Publication Data

US 2014/0042816 A1 Feb. 13, 2014

Related U.S. Application Data

(60) Provisional application No. 61/625,737, filed on Apr. 18, 2012.

(51) Int. Cl.
*H02J 1/00* (2006.01)
*H02J 1/08* (2006.01)

(52) U.S. Cl.
CPC .. *H02J 1/00* (2013.01); *H02J 1/08* (2013.01); *H02J 2001/008* (2013.01); *Y10T 307/653* (2015.04)

(58) Field of Classification Search
CPC ........ H02J 1/00; H02J 1/08; H02J 2001/008; Y10T 307/653
See application file for complete search history.

(56) References Cited

U.S. PATENT DOCUMENTS

| 5,108,848 | A | 4/1992 | Kramer |
|---|---|---|---|
| 5,162,164 | A | 11/1992 | Dougherty et al. |
| 5,169,735 | A | 12/1992 | Witehira |
| 5,316,868 | A | 5/1994 | Dougherty et al. |
| 6,734,651 | B2 | 5/2004 | Cook et al. |
| 7,388,349 | B2 | 6/2008 | Elder et al. |
| 7,567,057 | B2 | 7/2009 | Elder et al. |
| 7,675,261 | B2 | 3/2010 | Elder et al. |
| 7,679,314 | B2 | 3/2010 | Elder et al. |
| 7,692,404 | B2 * | 4/2010 | Harris ............................ 320/117 |
| 2009/0040037 | A1 * | 2/2009 | Schraga ........................ 340/459 |
| 2009/0230922 | A1 | 9/2009 | Elder et al. |
| 2010/0055546 | A1 | 3/2010 | Elder et al. |

* cited by examiner

*Primary Examiner* — Jared Fureman
*Assistant Examiner* — Aqeel Bukhari
(74) *Attorney, Agent, or Firm* — Roman Aguilera, III

(57) ABSTRACT

A device and method of use directed to providing various voltages based on the voltage selection by the user for various applications. In one embodiment, the device is comprised of two or more 12 volt batteries coupled in a manner that allows the voltage output of the device to be modified by allowing each battery to change from in parallel to in series with a switching device. In another embodiment, the switching device may control all batteries, there may be more than one switching device whereby a switching device may control one or more batteries, or each battery may have its own switching device to determine which state the battery is in.

20 Claims, 6 Drawing Sheets

MULTIPLE VOLTAGE POWER BOX

CROSS-REFERENCE TO RELATED APPLICATIONS

This application claims the benefit under Title 35 United States Code §119(e) of U.S. Provisional Patent Application Ser. No. 61/625,737; Filed: Apr. 18, 2012, the full disclosure of which is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention relates to a device and method of use directed to providing various voltages based on the voltage selection by the user for various applications. More specifically, the present invention relates to a device and method of use directed to providing various voltages based on the voltage selection by the user as a means of providing primary or auxiliary power to an electrical system.

BACKGROUND OF THE INVENTION

Without limiting the scope of the disclosed device and method, the background is described in connection with a novel device and approach to efficiently and effectively control various voltage outputs in one device to supply power to various electrical system applications.

The field's prior art reflects many approaches and devices in obtaining various output voltages for electrical system applications. These voltage output devices may be used as backup or auxiliary power sources. In addition, these voltage output devices may also be used to power external electrical devices. The prior art employs various approaches to providing this source of voltage output.

A first example of a voltage output device in the prior art is described in U.S. Pat. No. 7,679,314 issued on Mar. 16, 2010 to David W. Elder et al. In this example, the device comprises a second battery coupled to the primary battery as a means of supplying backup power. In this prior art, the configuration is limited and variable voltage outputs are not achieved or taught. Rather, the device functions as a backup device for the main battery.

A second example of a voltage output device in the prior art is described in U.S. Pat. No. 7,675,261 issued on Mar. 9, 2010 to David W. Elder et al. In this example, the device also comprises a second battery coupled to the primary battery as a means of supplying backup power. In this prior art, the configuration is also limited and variable voltage outputs are also not achieved or taught. Rather, the device also functions as a backup device for the main battery. Lastly, the configuration utilizes batteries pre-configured in the device's battery housing. This configuration further limits the application of this prior art from a structural and functional point of view.

A third example of a voltage output device is described in U.S. Pat. No. 6,734,651 issued on May 11, 2004 to Norman Cook et al. This voltage output device is directed to a backup battery power supply that utilizes a relay switch actuation means to connect the reserve battery to the primary battery.

In reality, a backup or auxiliary power source configured as disclosed in the prior art mentioned, severely limits the effectiveness, efficiency, and practicality of a voltage device to power electrical applications under various outputs. As a result, variable outputs are not taught in the prior art and applications are limited. For example, the variety in electrical applications, which may be connected to the device, will present various loads or voltage power depending on the requirements of the application.

While all of the aforementioned devices may fulfill their unique purposes, none of them fulfill the need for a practical, efficient, and effective means for controlling various voltage outputs in one device to supply power to various electrical system applications both as a primary or an auxiliary power source.

The present invention proposes a device and method of use directed to providing various voltages based on the voltage selection by the user as a means of providing primary or auxiliary power to an electrical system.

BRIEF SUMMARY OF THE INVENTION

The present invention, therefore, provides a device and method of use for providing various voltages based on the voltage selection by the user as a means of providing primary or auxiliary power to an electrical system.

In one embodiment, the device is comprised of two or more 12 volt batteries coupled in a manner that allows the voltage output of the device to be modified by allowing each battery to change from in parallel to in series with a switching device. In another embodiment, the switching device may control all batteries, there may be more than one switching device whereby a switching device may control one or more batteries, or each battery may have its own switching device to determine which state the battery is in. In yet another embodiment, the batteries may be of various voltages, other than the 12 volt battery, dependent on the electrical system's need. For example, 18 volt batteries may be used. In this embodiment the electrical system being powered utilizes an 18 volt battery as the main battery and the auxiliary batteries are all 18 volt batteries. One skilled in the art would appreciate the dynamic configurations with such a flexible device and the slight configuration changes that would be needed such as the solenoid modifications to handle the change in voltage for proper activation.

In summary, the present invention discloses a novel device and method of use directed to providing various voltages based on the voltage selection by the user for various electrical applications. More specifically, the present invention relates to a device and method of use directed to providing various voltages based on the voltage selection by the user as a means of providing primary or auxiliary power to an electrical system.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is a novel device and method of use for providing various voltages based on the voltage selection by the user as a means of providing primary or auxiliary power to an electrical system. The numerous innovative teachings of the present invention will be described with particular reference to several embodiments (by way of example, and not of limitation).

Figure 1:
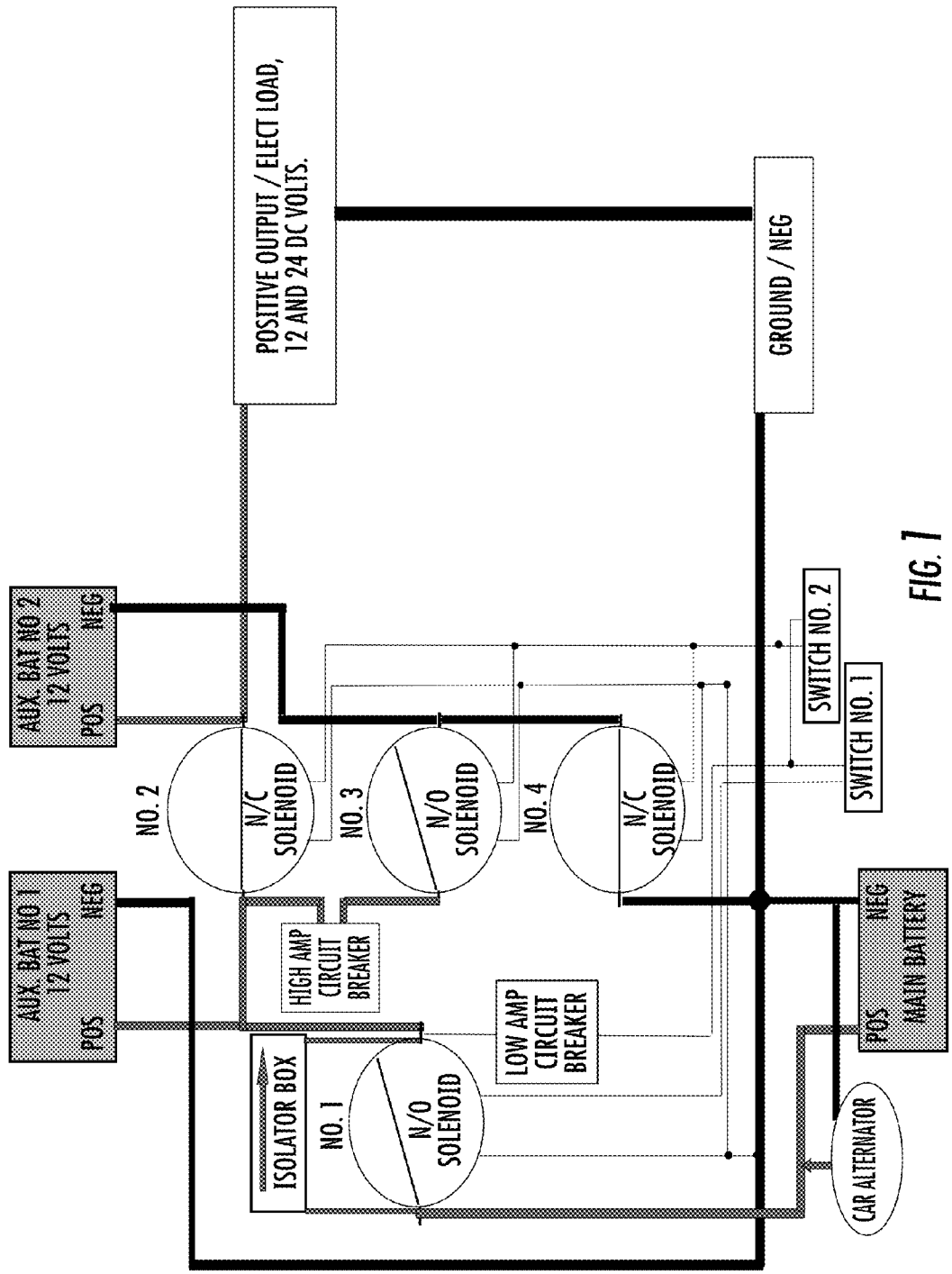
FIG. 1 is a layout of the multiple voltage power device having an output or load of 12 or 24 DC volts in accordance with embodiments of the disclosure.

Reference is first made to FIG. 1, a layout of the multiple voltage power device having an output or load of 12 or 24 DC volts in accordance with embodiments of the disclosure. For illustrative purposes, the rest of the description contained herein will focus on automotive and vehicle applications. In one specific application, the invention can be employed in custom vehicles also known as low-riders where after market parts and customizations are utilized. Many of these customizations require the powering of electrical systems for the customizations to function such as lights, sound systems, and jumping. Currently, custom vehicles utilize 5 batteries connected on 24, 36, and 48 volts. Once the batteries' power is depleted, the batteries need to be disconnected so they can be recharged. In addition, when various voltages are required, manual manipulation of the physical components are often required. For example, 24 volts are inadequate to meet the output demand and 48 volts are now required. In addition, there are times when the main battery of the vehicle fails or requires a jump. The novel device disclosed and claimed herein provides for multiple voltage outputs based on the voltage amount selected by the user for various electrical systems, charging of the auxiliary batteries by the vehicle's alternator, and serving as the vehicle's backup or auxiliary battery supply when the main battery fails and needs to be jumped. This exemplary embodiment provides the basic component configuration for the device. In this exemplary embodiment the two auxiliary batteries, the main battery, four solenoids, two switches, isolator box, and circuit breakers are shown. In this exemplary embodiment, the batteries are 12 volt batteries and the device is coupled with the main battery of the car as well as with the car's alternator. In this configuration, multiple 12 volt batteries can be switched from in parallel to in series for additional voltage output as desired. This changing of in parallel to in series is accomplished by the utilization of the switches. In this exemplary embodiment, the additional output would increase from 12 volts to 24 volts supplied by the two auxiliary batteries. Another additional aspect of this invention is that the device's configuration allows the batteries to be charged by the car alternator when the batteries are coupled in parallel. In this exemplary embodiment, the device is configured to allow a user to select a voltage output of 12 or 24 DC volts. The following figures provide for a more detailed explanation of the various benefits of the device.

Figure 2:
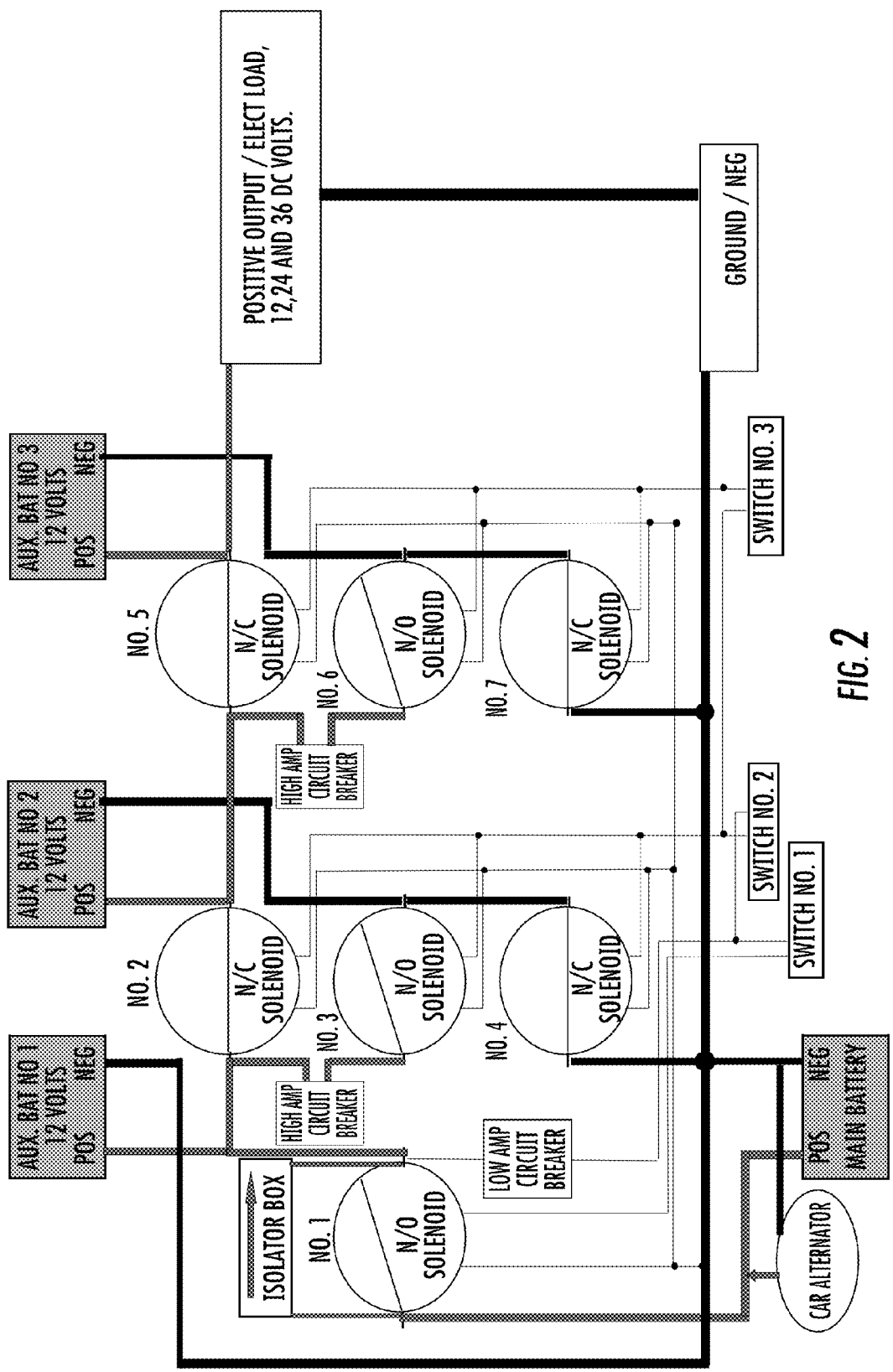
FIG. 2 is a layout of the multiple voltage power device having an output or load of 12 24, or 36 DC volts in accordance with embodiments of the disclosure.

Reference is next made to FIG. 2, a layout of the multiple voltage power device having an output or load of 12 24, or 36 DC volts in accordance with embodiments of the disclosure. In this exemplary embodiment the device is shown with an additional voltage output configuration. It is easily seen how the device can be configured with additional batteries, switches, and solenoids to provide additional voltage output based on the need of the electrical applications. From FIG. 1 to FIG. 2 an additional battery, three solenoids, a circuit breaker, and a switch are added for each additional voltage step needed in the device. In this exemplary embodiment, the device is configured with an additional step voltage output above FIG. 1 and allows the user to select a voltage output of 12, 24, or 36 DC volts.

Figure 3:
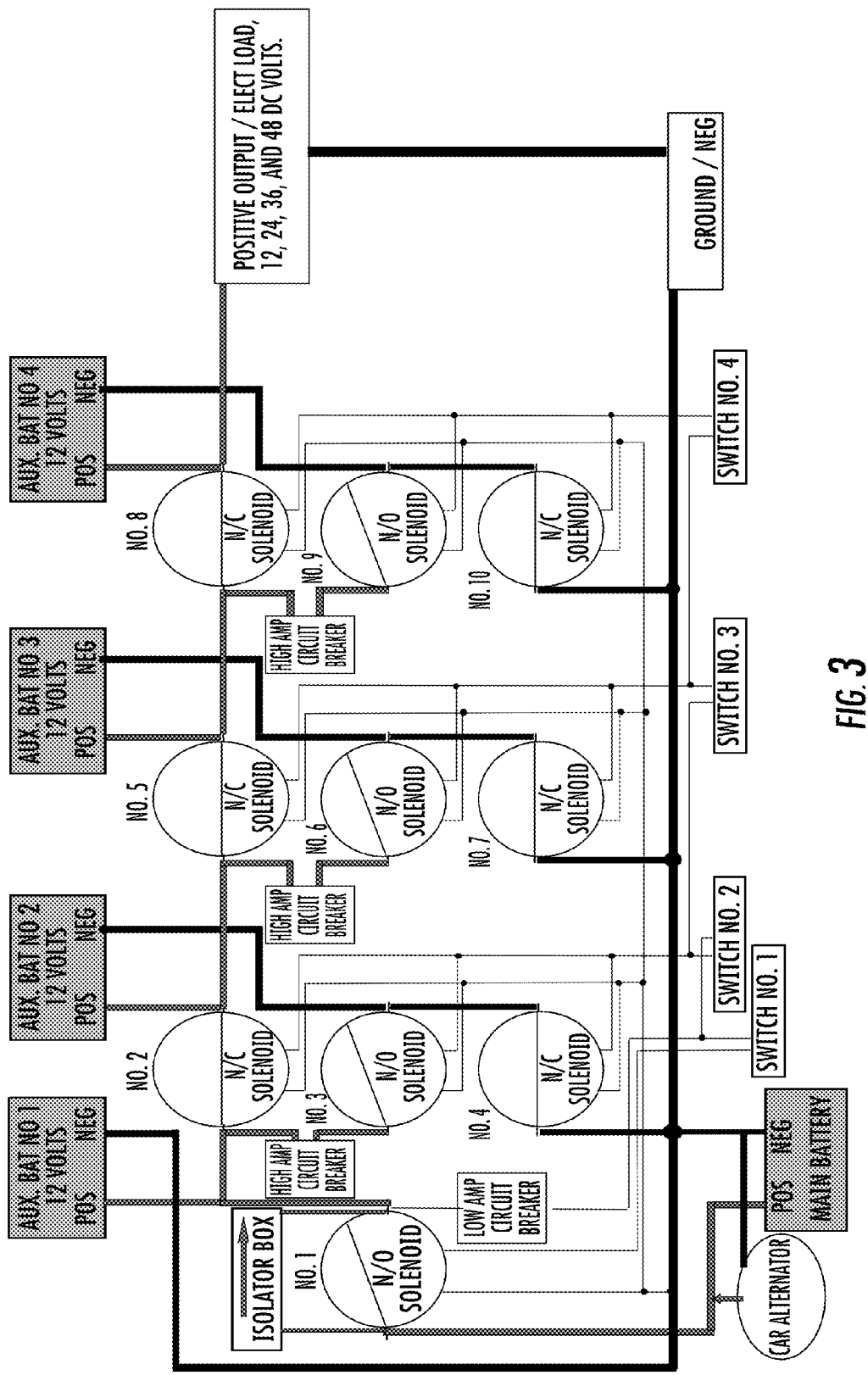
FIG. 3 is a layout of the multiple voltage power device having an output or load of 12 24, 36, or 48 DC volts in accordance with embodiments of the disclosure.

Reference is now made to FIG. 3, a layout of the multiple voltage power device having an output or load of 12 24, 36, or 48 DC volts in accordance with embodiments of the disclosure. In this exemplary embodiment, the device is configured with an additional step voltage output above FIG. 2 and allows the user to select a voltage output of 12, 24, 36, or 48 DC volts. This process of continuing to add voltage steps as described in FIGS. 2 and 3 can continue to achieve the desired voltage output. In alternative embodiments, the switching device may control all batteries, there may be more than one switching device whereby a switching device may control one or more batteries, or each battery may have its own switching device to determine which state (in parallel or in series) the battery is in.

Figure 4:
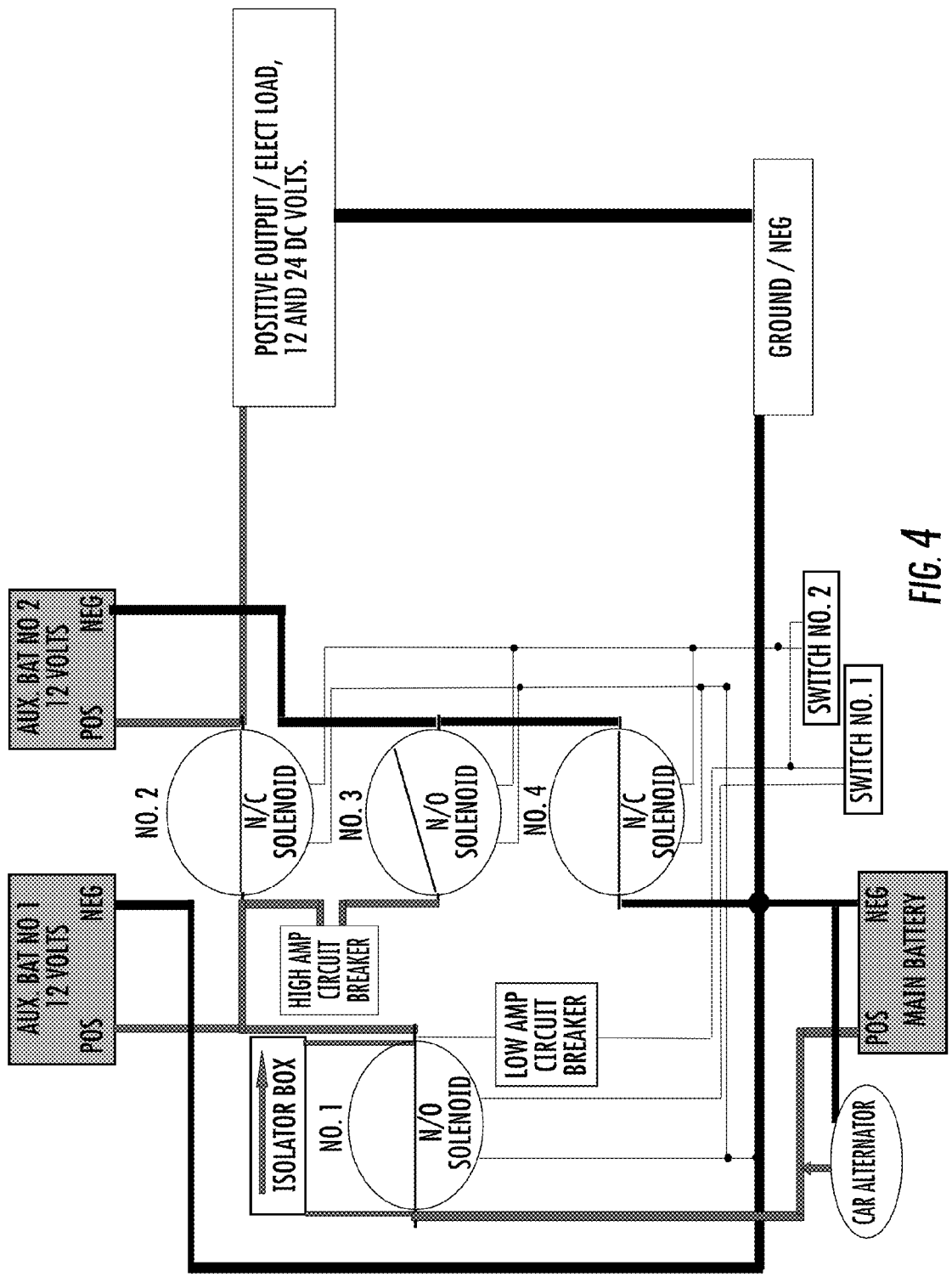
FIG. 4 is a layout of the multiple voltage power device having an output or load of 12 or 24 DC volts and the first switch turned on in accordance with embodiments of the disclosure.

Reference is now made to FIG. 4, a layout of the multiple voltage power device having an output or load of 12 or 24 DC volts and the first switch turned on in accordance with embodiments of the disclosure. When switch one is turned on, solenoid 1 is energized which allows high amps to flow from the car alternator to the auxiliary batteries while the vehicle is on or provide a jump to the main battery when the main battery is unable to start the vehicle. When switch one is turned on, energizing solenoid 1, the current will pass through the solenoid contacts instead of the isolator box that allows the charging of the auxiliary batteries or jumping of the main battery of the vehicle.

Figure 5:
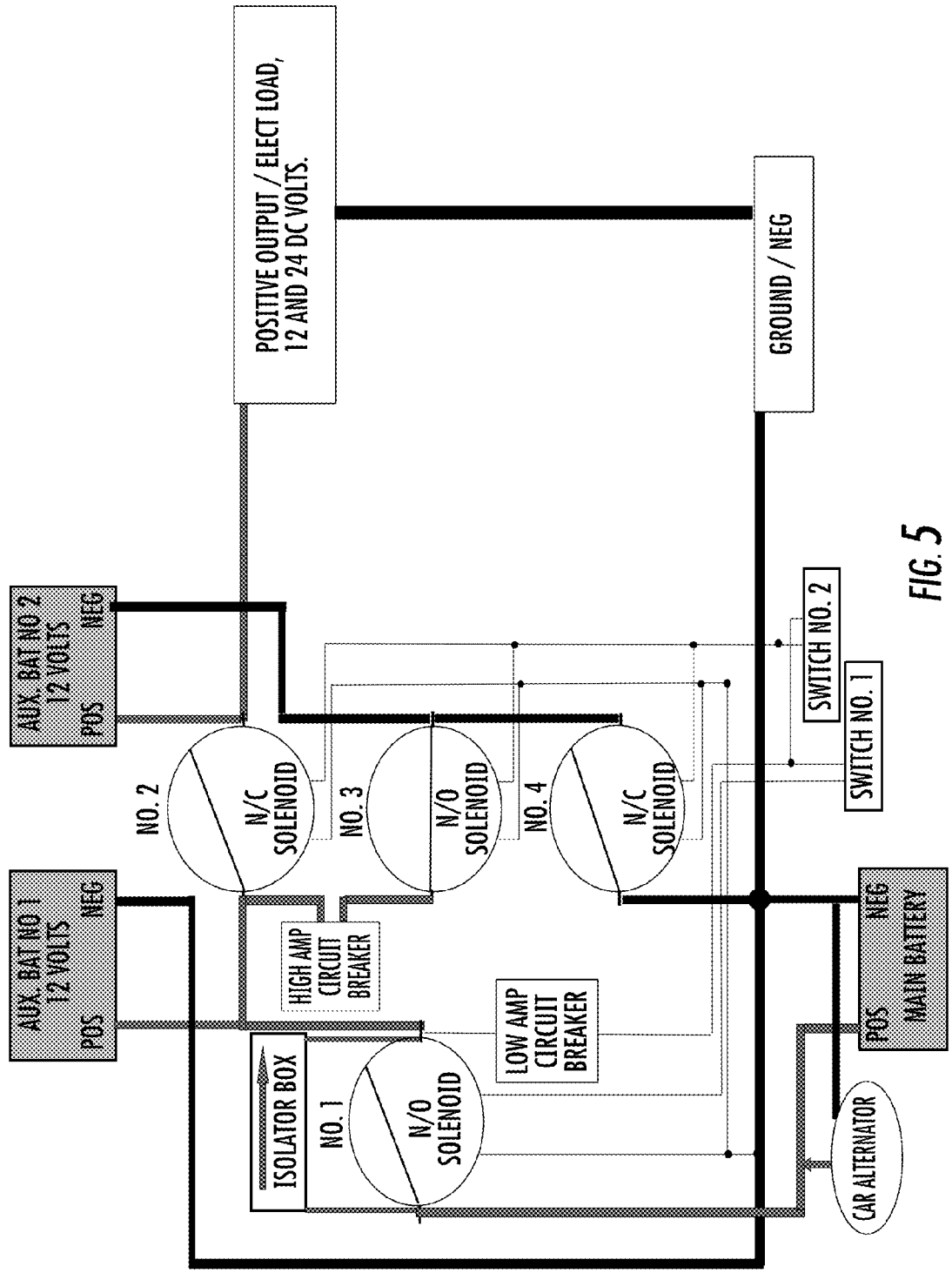
FIG. 5 is a layout of the multiple voltage power device having an output or load of 12 or 24 DC volts and the second switch turned on in accordance with embodiments of the disclosure.

Reference is now made to FIG. 5, a layout of the multiple voltage power device having an output or load of 12 or 24 DC volts and the second switch turned on in accordance with embodiments of the disclosure. When switch two is turned on, solenoids 2, 3, and 4 will energize. This action will close the circuit on solenoid 3, which is N/O, and will open the circuit on solenoids 2 and 4, which are N/C. This action allows the positive terminal of auxiliary battery 1 to connect to the negative terminal of auxiliary battery 2 creating an output of 24 volts on the positive terminal of auxiliary battery 2. The negative ground will always be used to compliment the voltage step loads.

Figure 6:
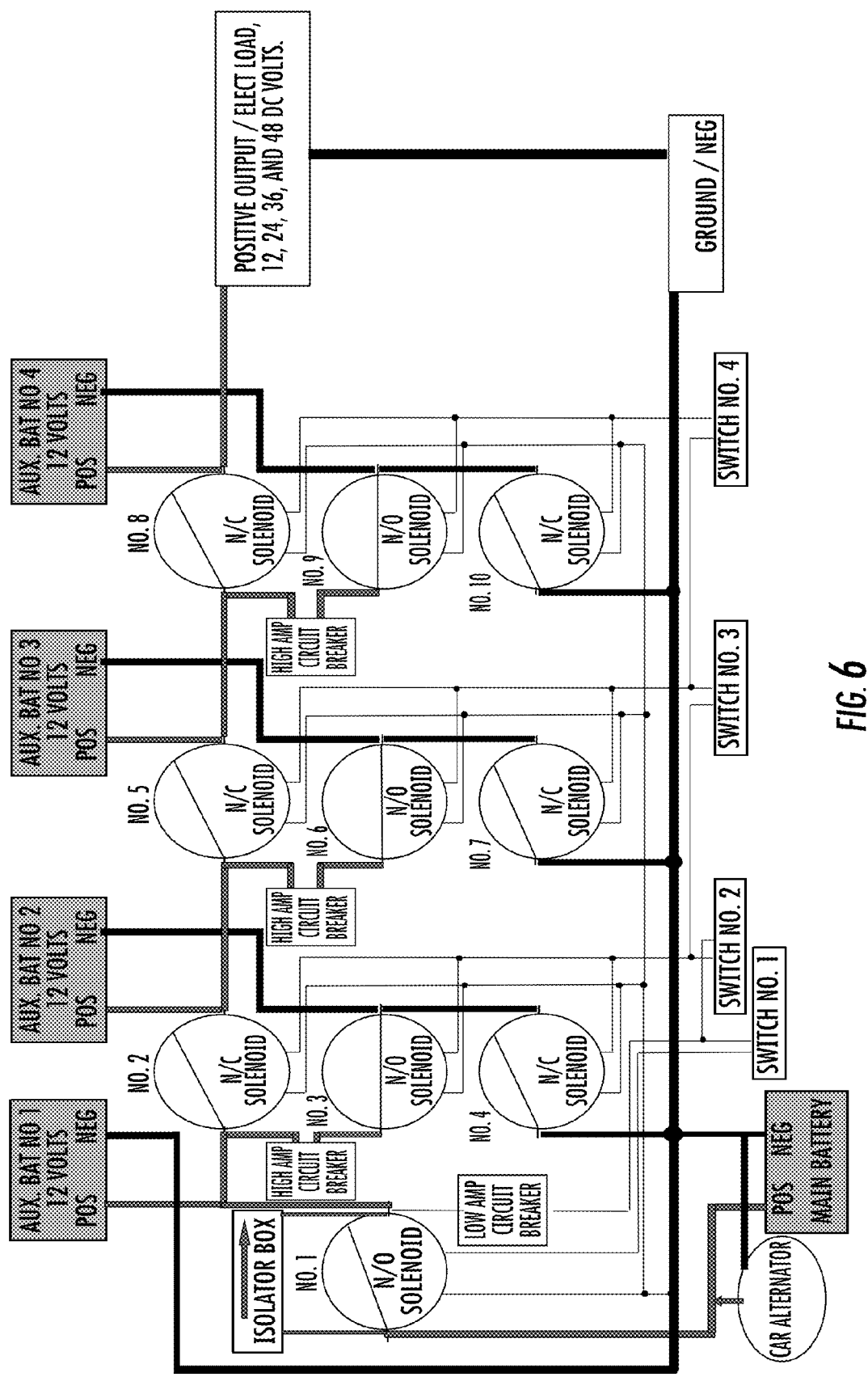
FIG. 6 is a layout of the multiple voltage power device having an output or load of 12 24, 36, or 48 DC volts and the second, third, and fourth switches turned on in accordance with embodiments of the disclosure.

Reference is last made to FIG. 6, a layout of the multiple voltage power device having an output or load of 12 24, 36, or 48 DC volts and the second, third, and fourth switches turned on in accordance with embodiments of the disclosure. In addition to the actions described in FIG. 5 for turning on switch 2, descriptions for turning on switches 3 and 4 will now be described. When switch 3 is turned on, solenoids 5, 6, and 7 will energize. This action will close the circuit on solenoid 6, which is N/O, and will open the circuit on solenoids 5 and 7, which are N/C. This action allows the positive terminal of auxiliary battery 2 to connect to the negative terminal of auxiliary battery 3 creating an output of 36 DC volts on the positive terminal of battery 3 which will then allow positive current to flow through solenoid 8, which is N/C. The negative ground will always be used to compliment the voltage step loads. When switch 4 is turned on, solenoids 8, 9, and 10 will energize. This action will close the circuit on solenoid 9, which is N/O, and will open the circuit on solenoids 8 and 10, which are N/C. This action allows the positive terminal of auxiliary battery 3 to connect to the negative terminal of auxiliary battery 4 creating an output of 48 DC volts on the positive terminal of battery 4 which will then allow positive current to flow as the output load. The negative ground will always be used to compliment the voltage step loads. As described, it can readily be seen how the device's output load can be increased by incremental configurations of the solenoids, auxiliary battery, circuit breaker, and a switch. In alternative embodiments a circuit breaker is not used. In yet another embodiment, the device is not comprised of batteries allowing the user to select and connect the batteries to the device in the desired configuration loads. For example, the device may contain connections for four auxiliary batteries as detailed in FIG. 5 but the user may only connect two auxiliary batteries for their electrical applications and when the need arises, connect an additional auxiliary battery. In another embodiment, the device may house all the components. In another embodiment, the device may house all the components except the auxiliary batteries that are connected externally to the main device's housing. Safety features may be employed such as low amp switch circuits being protected with built in low amp circuit breakers and high amp solenoid circuits being protected with built in high amp circuit breakers. In yet another embodiment, the layout of the device may enable the user to select any order of battery switching (in series to in parallel or vice versa) to obtain the desired output voltage.

In brief, a device and method of use for providing primary and auxiliary power is described herein. The device also provides for an effective and efficient means for controlling various voltage outputs for various electrical applications.

The disclosed device and method of use is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed device or method, except as may be outlined in the claims.

Alternative applications for this invention include using this device and method of use for voltage power output applications in various types of machines and electrical applications. Consequently, any embodiments comprising a one piece or multi piece device having the structures as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific device and method of use described herein. Such equivalents are considered to be within the scope of this invention and are covered by the claims.

All publications and patent applications mentioned in the specification are indicative of the level of those skilled in the art to which this invention pertains. All publications and patent application are herein incorporated by reference to the same extent as if each individual publication or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The device and/or methods disclosed and claimed herein can be made and executed without undue experimentation in light of the present disclosure. While the device and methods of this invention have been described in terms of preferred embodiments, it will be apparent to those skilled in the art that variations may be applied to the device and/or methods and in the steps or in the sequence of steps of the method described herein without departing from the concept, spirit, and scope of the invention.

More specifically, it will be apparent that certain components which are both shape and material related may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A variable voltage system for supplying electrical energy in various voltages depending on the application requirement of an electrical system, the variable voltage system comprising:
   a positive terminal and a negative terminal, at least one positive terminal and at least one negative terminal being electrically coupleable to the electrical system;
   a main battery, said main battery including a main positive output and a main negative output, the main positive output being electrically connected to at least one positive terminal, the main negative output being electrically connected to at least one negative terminal;
   at least one auxiliary battery, each said auxiliary battery including an auxiliary positive output and an auxiliary negative output, said auxiliary positive output being electrically connected to at least one positive terminal, said first auxiliary negative output being electrically connected to at least one negative terminal;
   at least one switch for each said battery, each said switch allowing each said auxiliary battery to be switched between in parallel or in series within the variable voltage system to control the voltage supplied to the electrical system;

said system configured to allow said batteries to be charged by a car alternator when the batteries are coupled in parallel.

2. A variable voltage system according to claim 1, wherein said auxiliary batteries are 12 volt batteries.

3. A variable voltage system according to claim 1, wherein said auxiliary batteries are 18 volt batteries.

4. A variable voltage system according to claim 1, wherein said auxiliary batteries are 24 volt batteries.

5. A variable voltage system according to claim 1, wherein said system is comprised of one said auxiliary battery.

6. A variable voltage system according to claim 1, wherein said system is comprised of two said auxiliary batteries.

7. A variable voltage system according to claim 1, wherein said system is comprised of three said auxiliary batteries.

8. A variable voltage system according to claim 1, wherein said system is comprised of at least four said auxiliary batteries.

9. A variable voltage system according to claim 1, wherein said system is also comprised of at least one switch electrically connected to two or more said auxiliary batteries, wherein said switch allows multiple said auxiliary batteries to be switched between in parallel or in series with one said switch.

10. A variable voltage system according to claim 1, wherein said system's switches are all electrically connected to two or more said auxiliary batteries, wherein said switch allows multiple said auxiliary batteries to be switched between in parallel or in series with one said switch.

11. A variable voltage system for supplying electrical energy in various voltages depending on the application requirement of an electrical system, the variable voltage system comprising:

a positive terminal and a negative terminal, at least one positive terminal and at least one negative terminal being electrically coupleable to a main battery;

at least one auxiliary battery, each said auxiliary battery including an auxiliary positive output and an auxiliary negative output, said auxiliary positive output being electrically connected to at least one positive terminal, said first auxiliary negative output being electrically connected to at least one negative terminal;

at least one switch for each said battery, each said switch allowing each said auxiliary battery to be switched between in parallel or in series within the variable voltage system to control the voltage supplied to the electrical system;

said system configured to allow said batteries to be charged by a car alternator when the batteries are coupled in parallel.

12. A variable voltage system according to claim 11, wherein said auxiliary batteries are 12 volt batteries.

13. A variable voltage system according to claim 11, wherein said auxiliary batteries are 18 volt batteries.

14. A variable voltage system according to claim 11, wherein said auxiliary batteries are 24 volt batteries.

15. A variable voltage system according to claim 11, wherein said system is comprised of one said auxiliary battery.

16. A variable voltage system according to claim 11, wherein said system is comprised of two said auxiliary batteries.

17. A variable voltage system according to claim 11, wherein said system is comprised of three said auxiliary batteries.

18. A variable voltage system according to claim 11, wherein said system is comprised of at least four said auxiliary batteries.

19. A variable voltage system according to claim 11, wherein said system is also comprised of at least one switch electrically connected to two or more said auxiliary batteries, wherein said switch allows multiple said auxiliary batteries to be switched between in parallel or in series with one said switch.

20. A variable voltage system according to claim 11, wherein said system's switches are all electrically connected to two or more said auxiliary batteries, wherein said switch allows multiple said auxiliary batteries to be switched between in parallel or in series with one said switch.

* * * * *